United States Patent
Kitao et al.

(10) Patent No.: US 8,871,389 B2
(45) Date of Patent: Oct. 28, 2014

(54) NON-AQUEOUS ELECTROLYTE SECONDARY BATTERY

(75) Inventors: Hideki Kitao, Kobe (JP); Yoshinori Kida, Kobe (JP); Noriyuki Shimizu, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 856 days.

(21) Appl. No.: 12/457,852

(22) Filed: Jun. 23, 2009

(65) Prior Publication Data

US 2009/0263719 A1  Oct. 22, 2009

Related U.S. Application Data

(62) Division of application No. 11/501,224, filed on Aug. 9, 2006, now Pat. No. 7,655,357.

(30) Foreign Application Priority Data

Aug. 11, 2005  (JP) .................................. 2005-233528
Sep. 26, 2005  (JP) .................................. 2005-278108

(51) Int. Cl.

| H01M 4/505 | (2010.01) |
|---|---|
| H01M 4/525 | (2010.01) |
| H01M 4/36 | (2006.01) |
| H01M 4/131 | (2010.01) |
| H01M 10/0525 | (2010.01) |
| H01M 4/02 | (2006.01) |
| H01M 4/485 | (2010.01) |

(52) U.S. Cl.
CPC .... *H01M 10/0525* (2013.01); *H01M 2004/028* (2013.01); *H01M 4/485* (2013.01); *H01M 4/505* (2013.01); *H01M 4/364* (2013.01); *Y02E 60/122* (2013.01); *H01M 4/525* (2013.01); *H01M 4/131* (2013.01); *Y02T 10/7011* (2013.01); *H01M 2004/021* (2013.01)
USPC ...... 429/224; 429/223; 429/231.1; 429/231.3

(58) Field of Classification Search
CPC ............................. H01M 4/505; H01M 4/525
USPC ........................... 429/224, 223, 231.3, 231.1
See application file for complete search history.

(56) References Cited

U.S. PATENT DOCUMENTS

| 2003/0108793 A1 | 6/2003 | Dahn et al. ..................... 429/224 |
| 2005/0202316 A1 | 9/2005 | Hwang et al. .............. 429/231.1 |

FOREIGN PATENT DOCUMENTS

| JP | 2002-100356 A | 4/2002 |
| JP | 2003-92108 A | 3/2003 |

*Primary Examiner* — Tracy Dove
(74) *Attorney, Agent, or Firm* — McDermott Will & Emery LLP

(57) ABSTRACT

A non-aqueous electrolyte secondary battery uses as its positive electrode active material a mixture of a first lithium-containing transition metal oxide containing nickel and manganese as transition metals and having a crystal structure belonging to the space group R3m and a second lithium-containing transition metal oxide containing nickel, cobalt, and manganese as transition metals and having a crystal structure belonging to the space group R3m, or a mixture of the first lithium-containing transition metal oxide and a lithium cobalt oxide. The first lithium-containing transition oxide is $Li_aNi_xMn_yO_2$ wherein $1 \le a \le 1.5$, $0.5 \le x+y \le 1$, $0<x<1$, and $0<y<1$. The second lithium-containing transition metal oxide is $Li_bNi_pMn_qCo_rO_2$ wherein $1 \le b \le 1.5$, $0.5 \le p+q+r \le 1$, $0<p<1$, $0<q<1$, and $0<r<1$.

2 Claims, 1 Drawing Sheet

NON-AQUEOUS ELECTROLYTE SECONDARY BATTERY

This application is a division of application Ser. No. 11/501,224, filed Aug. 9, 2006, now U.S. Pat. No. 7,655,357, which claims priority of Japanese Patent Application Nos. 2005-233528 and 2005-278108 filed Aug. 11, 2005, and Sep. 26, 2005, respectively, and which are incorporated herein by reference.

BACKGROUND OF THE INVENTION

1. Field of the Invention

The present invention relates to non-aqueous electrolyte secondary batteries, such as lithium secondary batteries.

2. Description of Related Art

Lithium-ion batteries are light in weight and capable of high power. For this reason, lithium-ion batteries in recent years have drawn attention as batteries for hybrid automobiles. A battery for hybrid automobiles is required to show relatively uniform power characteristics over a wide range of charge depth, in addition to high power characteristics. The purpose of this requirement is to reduce costs in the system by simplifying the control algorithm for battery input power.

Lithium-containing nickel-manganese composite oxides have drawn attention as a low-cost positive electrode material because they use nickel and manganese, which are rich in reserve, in comparison with lithium cobalt oxides, which have conventionally been used as a positive electrode active material. In particular, the lithium-containing nickel-manganese composite oxides are considered as good candidates for a positive electrode active material in the batteries for hybrid automobiles.

Nevertheless, a non-aqueous electrolyte secondary battery using a lithium-containing nickel-manganese oxide as its positive electrode active material has the problems of low discharge capacity and poor power characteristics due to its high resistance.

In view of the above-noted problems, Japanese Published Unexamined Patent Application No. 2003-92108 proposes the use of a lithium-manganese composite oxide having a spinel structure to improve low-temperature power characteristics of the battery. However, the use of the lithium-manganese composite oxide having a spinel structure, which has a discharge potential of about 4 V (vs. Li/Li$^+$), leads to the problems of insufficient power characteristics and moreover insufficient battery capacity. In addition, much research has been conducted on lithium-containing nickel-manganese-cobalt oxides as well. The lithium-containing nickel-manganese-cobalt oxides, however, tend to cause a great increase in resistance at later stages of discharge and are incapable of achieving uniform power characteristics over a wide range of charge depth, which means that the lithium-containing nickel-manganese-cobalt oxides are unsuitable for the batteries for hybrid automobiles.

U.S. Published Patent Application No. 2003/0108793 describes that the use of a positive electrode material Li(LiNiMn)O$_2$ in which lithium is arranged at transition metal sites improves discharge capacity considerably. Nevertheless, this technique has not yet been satisfactory in terms of uniform power characteristics.

BRIEF SUMMARY OF THE INVENTION

It is an object of the present invention to provide a non-aqueous electrolyte secondary battery that is capable of achieving uniform high power characteristics over a wide range of charge depth and is suitable for secondary batteries for use in hybrid automobiles or the like.

In order to accomplish the foregoing and other objects, the present invention provides a non-aqueous electrolyte secondary battery comprising: a positive electrode comprising a positive electrode active material; a negative electrode comprising a negative electrode active material; and a non-aqueous electrolyte having lithium ion conductivity, wherein the positive electrode active material comprises: a mixture of a first lithium-containing transition metal oxide containing nickel and manganese as transition metals and having a crystal structure belonging to the space group R3m, the first lithium-containing transition metal oxide being represented by the formula Li$_a$Ni$_x$Mn$_y$O$_2$ wherein 1≤a≤1.5, 0.5≤x+y≤1, 0<x<1, and 0<y<1, and a second lithium-containing transition metal oxide containing nickel, cobalt, and manganese as transition metals and having a crystal structure belonging to the space group R3m, the second lithium-containing transition metal oxide Li$_b$Ni$_p$Mn$_q$Co$_r$O$_2$ wherein 1≤b≤1.5, 0.5≤p+q+r≤1, 0<p<1, 0<q<1, and 0<r<1; or a mixture of the first lithium-containing transition metal oxide and a lithium cobalt oxide.

The present invention makes it possible to improve power characteristics of the battery dramatically and to obtain uniform power characteristics over a wide range of charge depth, by using a positive electrode active material in which the first lithium-containing transition metal oxide is mixed with the second lithium-containing transition metal oxide or with lithium cobalt oxide. Accordingly, when the non-aqueous electrolyte secondary battery of the present invention is used as a secondary battery for a hybrid automobile, a control algorithm in the hybrid automobile can be simplified and consequently the costs for the system can be reduced.

DETAILED DESCRIPTION OF THE INVENTION

Figure 1:
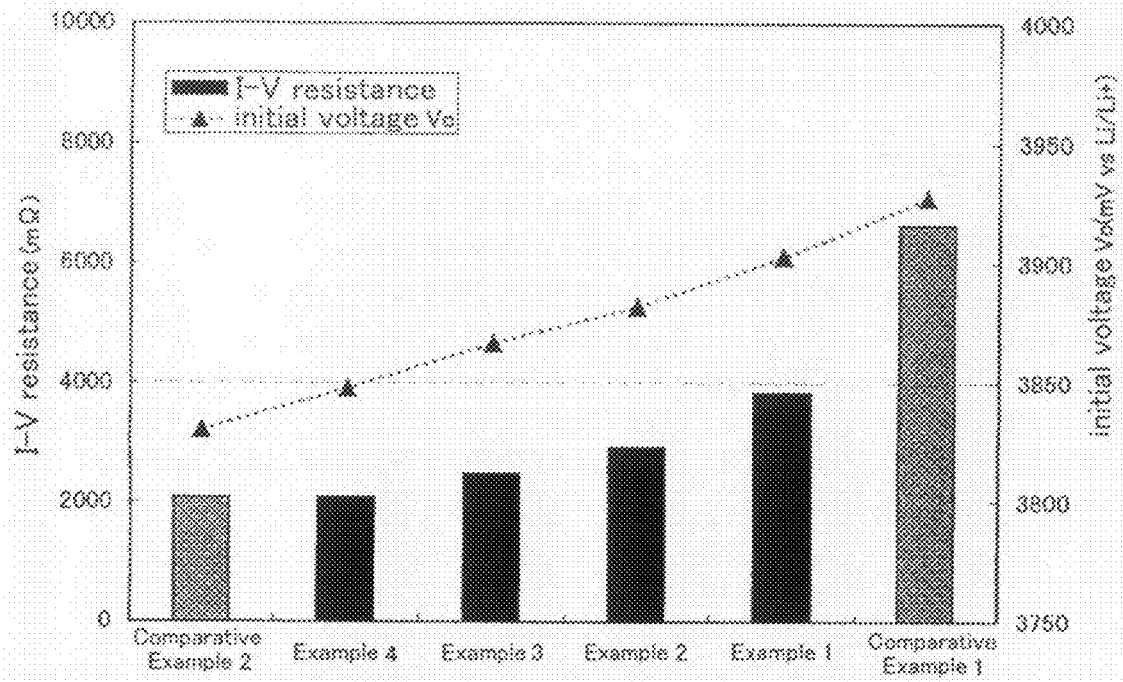
FIG. 1 is a graph showing the I-V resistances and initial voltages of the test cells of Examples 1 to 4 and Comparative Examples 1 and 2 in accordance with the present invention.

The non-aqueous electrolyte secondary battery according to the present invention uses, as a positive electrode active material, a mixture of a first lithium-containing transition metal oxide, which is a lithium-containing nickel-manganese oxide Li$_a$Ni$_x$Mn$_y$O$_2$, wherein 1≤a≤1.5, 0.5≤x+y≤1, 0<x<1, and 0<y<1, and a second lithium-containing transition metal oxide, which is a lithium-containing nickel-manganese-cobalt oxide, Li$_b$Ni$_p$Mn$_q$Co$_r$O$_2$, wherein 1≤b≤1.5, 0.5≤p+q+r≤1, 0<p<1, 0<q<1, and 0<r<1, or a mixture of the first lithium-containing transition metal oxide and lithium cobalt oxide. Thereby, the power characteristics of the battery are improved dramatically, and at the same time uniform power characteristics can be obtained over a wide range of charge depth.

In the present invention, it is preferable that the weight ratio of the mixture of the first lithium-containing transition metal oxide and the second lithium-containing transition metal oxide (the first lithium-containing transition metal oxide:the second lithium-containing transition metal oxide) and the weight ratio of the mixture of the first lithium-containing transition metal oxide and lithium cobalt oxide (the first lithium-containing transition metal oxide:lithium cobalt oxide) be in the range of 1:9 to 9:1, more preferably in the range of 2:8 to 8:2, and still more preferably in the range of 6:4 to 4:6. Controlling the weight ratios of the mixtures to be within these ranges makes the advantageous effects of the invention more effective, namely, achieving high power characteristics and obtaining uniform power characteristics over a wide range of charge depth.

More preferable ranges of x and y in the first lithium-containing transition metal oxide $Li_aNi_xMn_yO_2$ are $0<x\leq0.5$ and $0.5\leq y<1$, respectively. It is preferable that the mole ratio (x/y) of Ni/Mn in the first lithium-containing transition metal oxide be less than 1, and x+y<1. It is preferable that cobalt be contained in the second lithium-containing transition metal oxide in a mole ratio of 0.2 or greater with respect to the total content of the transition metals. More preferable ranges of p, q, and r in $Li_bNi_pMn_qCo_rO_2$ are $0<p\leq0.8$, $0.5\geq r\geq0.2$, and $0<q\leq0.5$, respectively.

The first lithium-containing transition metal oxide and the second lithium-containing transition metal oxide may contain at least one element selected from the group consisting of B, Mg, Al, Ti, Cr, V, Nb, Zr, Sn, and Mo at a mole ratio of 0.1 or less, with respect to the total moles of the metals other than lithium.

Likewise, the lithium cobalt oxide may contain at least one element selected from the group consisting of B, Mg, Al, Ti, Cr, V, Nb, Zr, Sn, Mo, W, and P. It is preferable that the content be 0.1 or less, based on the mole ratio with respect to the total moles of the metals other than lithium.

In the present invention, a portion of the lithium in each of the first lithium-containing transition metal oxide and the second lithium-containing transition metal oxide may be contained at a 3b site of the transition metals. In this case, it is preferable to set the end-of-charge potential in the initial charging at 4.45 V or higher but 4.65 V or less, from the viewpoint of improvement in power characteristics. Furthermore, it is preferable that the particle size of these oxides be within the range of from 1 μm to 20 μm, and that these oxides have a BET specific surface area of from 0.1 $m^2$/g to 3 $m^2$/g.

Both the first lithium-containing transition metal oxide and the second lithium-containing transition metal oxide used in the present invention have a crystal structure belonging to the space group R3m. Such a crystal structure may be confirmed by X-ray diffraction analysis. The lithium cobalt oxide also has a crystal structure belonging to the space group R3m.

The negative electrode active material used in the present invention is not particularly limited as long as it can be used for non-aqueous electrolyte batteries, but carbon materials are preferable.

In the present invention, the solute (supporting salt) of the non-aqueous electrolyte may be any lithium salt that is generally used as a solute in non-aqueous electrolyte secondary batteries. Examples of the lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. In addition to these solutes, the non-aqueous electrolyte may contain a lithium salt having an oxalato complex as anion. An example of such a lithium salt is lithium-bis(oxalato)borate.

The solvent of the non-aqueous electrolyte used in the present invention may be any solvent that has conventionally been used as a solvent for an electrolyte in non-aqueous electrolyte secondary batteries. Particularly preferable is a mixed solvent of a cyclic carbonate and a chain carbonate. Examples of the cyclic carbonate include ethylene carbonate, propylene carbonate, butylene carbonate, and vinylene carbonate. Examples of the chain carbonate include dimethyl carbonate, methyl ethyl carbonate, and diethyl carbonate.

Hereinbelow, the present invention is described in further detail based on examples thereof. It should be construed, however, that the present invention is not limited to the following preferred embodiments but various changes and modifications are possible without departing from the scope of the invention.

Example 1

Preparation of Positive Electrode Active Material

A lithium-containing nickel-manganese oxide, which serves as the first lithium-containing transition metal oxide in the present invention, was prepared in the following manner. $Li_2CO_3$ and $(Ni_{0.5}Mn_{0.5})_3O_4$ were mixed together at a mole ratio of 1.1:1, and the resultant mixture was baked in an air atmosphere at 900° C. for 20 hours. The composition of the lithium-containing nickel-manganese oxide thus obtained was $Li_{1.1}Ni_{0.5}Mn_{0.5}O_2$.

A lithium-containing nickel-manganese-cobalt oxide, which serves as the second lithium-containing transition metal oxide in the present invention, was prepared in the following manner. $Li_2CO_3$ and $(Ni_{0.4}Co_{0.3}Mn_{0.3})_3O_4$ were mixed together at a mole ratio of 1.15:1, and the resultant mixture was baked in an air atmosphere at 900° C. for 20 hours. The composition of the lithium-containing nickel-manganese-cobalt oxide thus obtained was $Li_{1.15}Ni_{0.4}Co_{0.3}Mn_{0.3}O_2$.

The lithium-containing nickel-manganese oxide obtained in the above-described manner had a particle size of 10 μm and a BET specific surface area of 1.0 $m^2$/g. The lithium-containing nickel-manganese-cobalt oxide obtained in the above-described manner also had a particle size of 10 μm and a BET specific surface area of 1.0 $m^2$/g. It was confirmed by X-ray diffraction analysis that both of the materials had a crystal structure belonging to the space group R3m.

Preparation of Positive Electrode

The first and second lithium-containing transition metal oxides thus prepared were mixed together at a weight ratio of 8:2 (the first lithium-containing transition metal oxide:the second lithium-containing transition metal oxide). The resultant mixture was mixed with a carbon material as a conductive agent and an N-methyl-pyrrolidone solution in which polyvinylidene fluoride as a binder agent was dissolved, so that the weight ratio of the active material, the conductive agent, and the binder agent were 90:5:5 to prepare a positive electrode slurry. The slurry thus prepared was applied onto an aluminum foil serving as a current collector and then dried. Thereafter, the aluminum foil coated with the positive electrode slurry was pressure-rolled with pressure rollers, and a current collector tab was attached thereto. Thus, a positive electrode was prepared.

Preparation of Electrolyte Solution $LiPF_6$ as a solute was dissolved at a concentration of 1 mole/liter into a mixed solvent of 3:7 volume ratio of ethylene carbonate (EC) and diethyl carbonate (DEC) to thus prepare an electrolyte solution.

Preparation of Three-Electrode Beaker Cell

The positive electrode prepared in the above-described manner was used as a working electrode, and metallic lithium was used for a counter electrode and a reference electrode. The electrolyte solution prepared in the above-described manner was filled into a container into which three electrodes were arranged. Thus, a three-electrode beaker cell A1 was prepared.

Example 2

A test cell A2 was prepared in the same manner as in Example 1, except that the mixture ratio of the first lithium-containing transition metal oxide and the second lithium-containing transition metal oxide was 6:4 (weight ratio).

Example 3

A test cell A3 was prepared in the same manner as in Example 1, except that the mixture ratio of the first lithium-containing transition metal oxide and the second lithium-containing transition metal oxide was 4:6 (weight ratio).

Example 4

A test cell A4 was prepared in the same manner as in Example 1, except that the mixture ratio of the first lithium-containing transition metal oxide and the second lithium-containing transition metal oxide was 2:8 (weight ratio).

Comparative Example 1

A test cell B was prepared in the same manner as in Example 1, except that the first lithium-containing transition metal oxide alone was used as the positive electrode active material.

Comparative Example 2

A test cell C was prepared in the same manner as in Example 1, except that the second lithium-containing transition metal oxide alone was used as the positive electrode active material.

Comparative Example 3

A test cell D was prepared in the same manner as in Example 1, except that the positive electrode active material was an 8:2 weight ratio mixture of the first lithium-containing transition metal oxide and a lithium manganese oxide ($Li_{1.1}Mn_{1.9}O_4$) having a spinel structure.

The test cells prepared in the manners described in Examples 1 to 4 and Comparative Examples 1 to 3 were subjected to the following charge-discharge test and I-V resistance measurement test.

Charge-Discharge Test

Each of the cells was charged at 1 mA to 4300 mV (vs. Li/Li$^+$) at room temperature, then rested for 10 minutes, and then discharged at 1 mA to 2000 mV (vs. Li/Li$^+$), to thus calculate the rated discharge capacity.

I-V Resistance Measurement Test

The cells were discharged to 2000 mV (vs. Li/Li$^+$) under the just-described charge-discharge test condition, and thereafter charged at 1 mA to 10% and 50% of the rated discharge capacity, and the following tests were carried out.
(1) 5 mA charge (10 seconds)→rest (10 minutes)→5 mA discharge (10 seconds)→rest (10 minutes)
(2) 10 mA charge (10 seconds)→rest (10 minutes)→10 mA discharge (10 seconds)→rest (10 minutes)
(3) 20 mA charge (10 seconds)→rest (10 minutes)→20 mA discharge (10 seconds)→rest (10 minutes)

The charge-discharge tests (1) to (3) were carried out in that order at room temperature. The highest potential reached in each charging was measured, and from the gradient of the potential values with respect to the current values, I-V resistances were calculated. From The I-V resistances obtained and the initial voltage Vo at the start of the above test (1), input power values were calculated using the following equation:

Input power (W)=(4300−Vo)/I-V resistance×4300

The rated discharge capacity, the initial voltage Vo, the I-V resistance, and the input power of each of the test cells are shown in Table 1 (input power characteristics at 50% SOC) and Table 2 (input power characteristics at 10% SOC).

TABLE 1

| | Cell | $Li_{1.1}Ni_{0.5}Mn_{0.5}O_2$ mixture ratio (wt. %) | Rated discharge capacity (mAh/g) | Initial voltage Vo (mV vs. Li/Li$^+$) | I-V resistance (mΩ) | Input power (W) |
|---|---|---|---|---|---|---|
| Ex. 1 | A1 | 80 | 124 | 3902 | 3845 | 444 |
| Ex. 2 | A2 | 60 | 133 | 3881 | 2914 | 617 |
| Ex. 3 | A3 | 40 | 139 | 3866 | 2492 | 748 |
| Ex. 4 | A4 | 20 | 145 | 3847 | 2085 | 933 |
| Comp. Ex. 1 | B | 100 | 116 | 3927 | 6655 | 240 |
| Comp. Ex. 2 | C | 0 | 149 | 3830 | 2082 | 969 |
| Comp. Ex. 3 | D | 80 (mixture with lithium manganese oxide) | 133 | 3930 | 2333 | 681 |

TABLE 2

| | Cell | Proportion of $Li_{1.1}Ni_{0.5}Mn_{0.5}O_2$ (wt. %) | I-V resistance (mΩ) | Input power (W) | Difference between Input power at 50% SOC − Input power at 10% SOC |
|---|---|---|---|---|---|
| Ex. 1 | A1 | 80 | 4424 | 527 | 83 |
| Ex. 2 | A2 | 60 | 3614 | 698 | 81 |
| Ex. 3 | A3 | 40 | 3800 | 634 | 114 |

TABLE 2-continued

| Cell | | Proportion of $Li_{1.1}Ni_{0.5}Mn_{0.5}O_2$ (wt. %) | I-V resistance (mΩ) | Input power (W) | Difference between Input power at 50% SOC – Input power at 10% SOC |
|---|---|---|---|---|---|
| Ex. 4 | A4 | 20 | 3783 | 606 | 327 |
| Comp. Ex. 1 | B | 100 | 7607 | 292 | 52 |
| Comp. Ex. 2 | C | 0 | 4007 | 585 | 384 |
| Comp. Ex. 3 | D | 80 (mixture with lithium manganese oxide) | 6670 | 389 | 292 |

Figure 2:
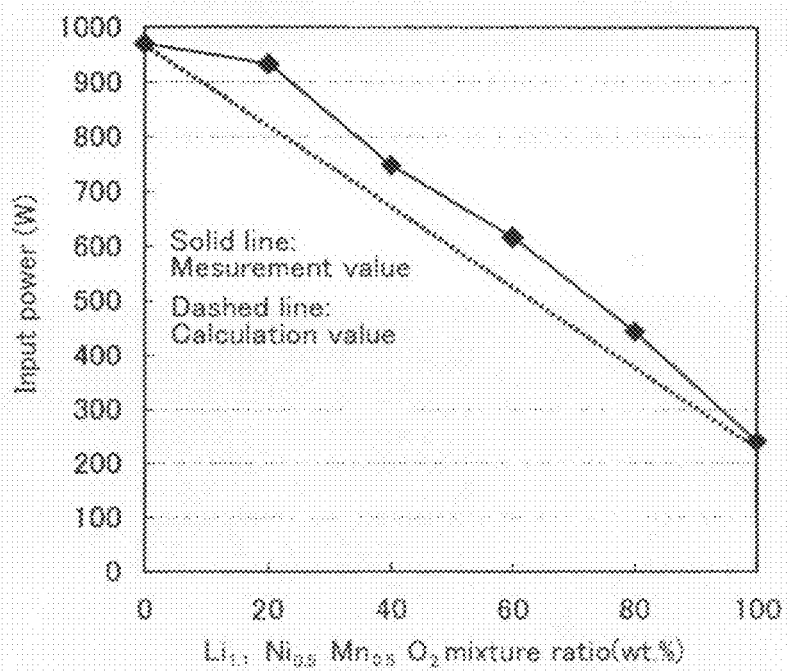
FIG. 2 is a graph illustrating the relationship between input power versus mixture ratio of the first lithium-containing transition metal oxide and the second lithium-containing transition metal oxide.

FIG. 1 shows the I-V resistances and the initial voltages of the test cells of Examples 1 to 4 and Comparative Examples 1 and 2. FIG. 2 shows the relationship between input power and the mixture ratios of the first lithium-containing transition metal oxide $Li_{1.1}Ni_{0.5}Mn_{0.5}O_2$. As clearly seen from FIGS. 1 and 2, adding the second lithium-containing transition metal oxide to the first lithium-containing transition metal oxide according to the present invention caused the I-V resistance and the input power to differ from those expected from the weighted average of the mixture ratios, exceptionally improving the I-V resistance and input power. In addition, by adding the second lithium-containing transition metal oxide, the initial voltage Vo lowered, improving the input power characteristics. Comparative Example 3, in which the lithium manganese oxide having a spinel structure ($Li_{1.1}Mn_{1.9}O_4$) was added, did not yield sufficient input power characteristics because of the increase of initial voltage Vo originating from its high discharge potential.

In addition, as shown in Table 2, Comparative Example 2, which used the lithium-containing nickel-manganese-cobalt oxide alone, showed the greatest input power difference between the input power at 50% SOC and that at 10% SOC. In contrast, Examples 1 to 4, each of which used a mixture of a lithium-containing nickel-manganese oxide and a lithium-containing nickel-manganese-cobalt oxide according to the present invention, showed smaller differences between the input power at 50% SOC and the input power at 10% SOC than Comparative Example 2, and moreover, they yielded relatively high input power. Thus, it will be understood that the present invention makes it possible to obtain uniform and high input power over a wide range of charge depth.

Although the details of workings of the above-described advantageous effect achieved by the present invention have not yet been clearly understood, it is believed that adding a lithium-containing nickel-manganese-cobalt oxide to a lithium-containing nickel-manganese oxide improves the electrochemical activity of the lithium-containing nickel-manganese oxide, and moreover, reduces the dependence of the power characteristics on the depth of charge and discharge.

Example 5

A test cell A5 was prepared in the same manner as in Example 1, except for the following. $Li_2Co_3$ and $(Ni_{0.1}Mn_{0.6})_3O_4$ were mixed together at a mole ratio of 1.3:0.7, and the resultant mixture was baked in an air atmosphere at 1000° C. for 20 hours, to thus prepare a lithium-containing nickel-manganese oxide $Li_{1.3}Ni_{0.1}Mn_{0.6}O_2$, which was used as the first positive electrode active material. The first positive electrode active material thus prepared was mixed with the second positive electrode active material $Li_{1.15}Ni_{0.4}Co_{0.3}Mn_{0.3}O_2$ at a weight ratio of 1:1.

Example 6

A test cell A6 was prepared in the same manner as in Example 5, except that a lithium cobalt oxide containing other elements, $LiCo_{0.99}Zr_{0.005}Mg_{0.005}O_2$, was used as the second positive electrode active material.

Comparative Example 4

A test cell E was prepared in the same manner as in Example 1, except that $Li_{1.3}Ni_{0.1}Mn_{0.6}O_2$ alone was used as the positive electrode active material.

Comparative Example 5

A test cell F was prepared in the same manner as in Example 1, except that a lithium cobalt oxide containing other elements $LiCo_{0.99}Zr_{0.005}Mg_{0.005}O_2$ alone was used as the positive electrode active material.

Charge-Discharge Test

Each of the cells was charged at 1 mA to 4600 mV (vs. Li/Li$^+$) at room temperature, then rested for 10 minutes, and then discharged at 1 mA to 2000 mV (vs. Li/Li$^+$), to thus calculate the discharge capacity.

I-V Resistance Measurement Test

The cells were discharged to 2000 mV (vs. Li/Li$^+$) under the just-described charge-discharge test condition, and thereafter charged at 1 mA to 30% and 70% of the discharge capacity, and the following tests were carried out.
(1) 5 mA charge (10 seconds)→rest (10 minutes)→5 mA discharge (10 seconds)→rest (10 minutes)
(2) 10 mA charge (10 seconds)→rest (10 minutes)→10 mA discharge (10 seconds)→rest (10 minutes)
(3) 20 mA charge (10 seconds)→rest (10 minutes)→20 mA discharge (10 seconds)→rest (10 minutes)

The charge-discharge tests (1) to (3) were carried out in that order at room temperature. The highest potential reached in each charging was measured, and from the gradient of the potential values with respect to the current values, I-V resistances were calculated. From The I-V resistances obtained and the initial voltage Vo at the start of the above test (1), input power values were calculated using the following equation.

Input power $(W) = (4300 - Vo)/I\text{-}V \text{ resistance} \times 4300$

The input power and input power difference for each of the cells are shown in Table 3.

TABLE 3

| | Cell | Positive electrode active material | Input power at SOC 70% (W) | Input power at SOC 30% (W) | Input power at SOC 30% – 70% (W) |
|---|---|---|---|---|---|
| Ex. 5 | A5 | $Li_{1.3}Ni_{0.1}Mn_{0.6}O_2$ + $Li_{1.15}Ni_{0.4}Co_{0.3}O_2$ 1:1 mixture | 420 | 463 | 43 |
| Ex. 6 | A6 | $Li_{1.3}Ni_{0.1}Mn_{0.6}O_2$ + $LiCo_{0.09}Zr_{0.005}Mg_{0.005}O_2$ 1:1 mixture | 167 | 174 | 6.8 |
| Comp. Ex. 4 | E | $Li_{1.3}Ni_{0.1}Mn_{0.6}O_2$ alone | 110 | 230 | 120 |
| Comp. Ex. 5 | F | $LiCo_{0.09}Zr_{0.005}Mg_{0.005}O_2$ alone | 408 | 658 | 250 |

The test results shown in Table 3 clearly demonstrate that mixing $Li_{1.3}Ni_{0.1}Mn_{0.6}O_2$ with either $Li_{1.15}Ni_{0.4}Co_{0.3}Mn_{0.3}O_2$ or $LiCo_{0.99}Zr_{0.005}Mg_{0.005}O_2$ makes it possible to reduce variations in input power with respect to changes in SOC considerably. Thus, it is possible to fabricate a battery that shows little dependence of power on the depth of charge and discharge.

Although the details of workings of the above-described advantageous effect achieved by the present invention have not yet been clearly understood, it is believed that the effects of improving the electrochemical activity of the lithium-containing nickel-manganese oxide and reducing the dependence of power on charge depth, which is achieved by the addition of another type of positive electrode active material, emerges more evidently because the positive electrode material comprising a lithium-containing nickel-manganese oxide having a large proportion of manganese shows a low electron conductivity.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A non-aqueous electrolyte secondary battery comprising:

a positive electrode comprising a positive electrode active material;

a negative electrode comprising a negative electrode active material; and a non-aqueous electrolyte having lithium ion conductivity, wherein the positive electrode active material consists of a mixture of a first lithium-containing transition metal oxide containing nickel and manganese as transition metals and having a crystal structure belonging to the space group R3m, the first lithium-containing transition metal oxide being represented by the formula $Li_aNi_xMn_yO$, wherein $1 \leq a \leq 1.5$, $0.5 \leq x+y \leq 1$, $0<x<1$, and $0<y<1$, and a second lithium-containing transition metal oxide containing nickel, cobalt, and manganese as transition metals and having a crystal structure belonging to the space group R3m, the second lithium-containing transition metal oxide being represented by the formula $Li_bNi_pMn_qCo_rO_2$ wherein $1 \leq b \leq 1.5$, $0.5 \leq p+q+r \leq 1$, $0<p<1$, $0<q<1$, and $0<r<1$, wherein, in the first lithium-containing transition metal oxide, the mole ratio (x/y) of Ni/Mn is 1.

2. The non-aqueous electrolyte secondary battery according to claim 1, wherein the weight ratio of the mixture of the first lithium-containing transition metal oxide and the second lithium-containing transition metal oxide (the first lithium-containing transition metal oxide:the second lithium-containing transition metal oxide) is in the range of 2:8 to 8:2.

* * * * *